(12) United States Patent
Zambaldo

(10) Patent No.: US 8,007,696 B2
(45) Date of Patent: Aug. 30, 2011

(54) METHOD FOR PREPARING A POROUS CERAMIC MATERIAL WITH HIGH HEAT RESISTANCE

(75) Inventor: Germano Zambaldo, Verona (IT)

(73) Assignee: Z.G. Camini Inox S.R.L., Verona (IT)

( * ) Notice: Subject to any disclaimer, the term of this patent is extended or adjusted under 35 U.S.C. 154(b) by 240 days.

(21) Appl. No.: 12/087,899

(22) PCT Filed: Feb. 16, 2007

(86) PCT No.: PCT/EP2007/001379
§ 371 (c)(1),
(2), (4) Date: Jul. 17, 2008

(87) PCT Pub. No.: WO2007/096102
PCT Pub. Date: Aug. 30, 2007

(65) Prior Publication Data
US 2009/0018009 A1   Jan. 15, 2009

(30) Foreign Application Priority Data
Feb. 20, 2006  (IT) .............................. VR2006A0035

(51) Int. Cl.
*B29C 65/00*  (2006.01)
*C01B 33/26*  (2006.01)
*C01B 33/32*  (2006.01)

(52) U.S. Cl. ........... 264/42; 264/41; 264/43; 423/330.1; 423/333

(58) Field of Classification Search .................. 264/42, 264/43, 44, 41; 501/12, 80, 84; 423/330.1, 423/333, 338
See application file for complete search history.

(56) References Cited

U.S. PATENT DOCUMENTS

| | | | | |
|---|---|---|---|---|
| 4,574,063 A * | 3/1986 | Scherer | .......................... | 65/395 |
| 4,997,694 A * | 3/1991 | Legare | .......................... | 428/71 |
| 5,789,075 A * | 8/1998 | Frank et al. | ................. | 428/312.6 |
| 6,541,539 B1 | 4/2003 | Yang et al. | | |
| 2004/0070096 A1 * | 4/2004 | Grader et al. | ................... | 264/42 |

FOREIGN PATENT DOCUMENTS

FR    2 873 685 A1    2/2006

OTHER PUBLICATIONS

Rigacci A et al"Improvement of the silica aerogel strengthening process for scaling-up monolithic production"Journal of Non-Crystalline Solids,North-Holland Physics Publishing.Amsterdam,NL,vol. 350,Dec. 15, 2004, pp. 196-201,XP004905659.

* cited by examiner

*Primary Examiner* — Jerry A Lorengo
*Assistant Examiner* — Noah Wiese
(74) *Attorney, Agent, or Firm* — Modiano & Associati; Albert Josif; Daniel J. O'Byrne

(57) ABSTRACT

The present invention relates to a method for preparing a porous ceramic material, particularly for thermal insulation, comprising the steps of:
- providing a first composition in the form of a stable aqueous colloidal solution of silica and oxides of alkaline metals;
- providing a second stable composition in the form of a suspension in an organic liquid of inorganic and/or organic particles, the second composition containing compounds which, when the second composition is mixed with the first composition, can destabilize the first composition, forming gel, and can form an organic polymeric net together with a blowing agent;
- mixing the first composition and the second composition to form a mixture;
- forming from the mixture a porous structure in gel form, where an organic structure supports inorganic structures being formed;
- solidifying the porous structure in gel form, obtaining a porous ceramic material in which an organic polymeric net surrounds inorganic portions.

19 Claims, 10 Drawing Sheets

METHOD FOR PREPARING A POROUS CERAMIC MATERIAL WITH HIGH HEAT RESISTANCE

The present invention relates to a method for preparing porous ceramic materials of the type with high heat resistance, for high heat insulation, in particular for industrial applications as insulating parts for high-temperature processes, having even complex shapes obtained by extrusion or injection molding.

BACKGROUND OF THE INVENTION

It is known to prepare a body constituted by a porous material by mixing powders or granulates of materials of the ceramic type, generally $Al_2O_3$, $SiO_2$, $TiO_2$, $ZrO_2$, CSi, TiC, NSi and alkaline oxides such as $Na_2O$, $K_2O$, with a binder selected among organic materials such as acetic acid, sodium acetate, zinc acetate, propionic acid [1]. The process entails a reaction of the particles of metallic oxides with the binder, at a temperature below the sintering temperature at which the mixture is subjected to fire and drying.

A method is also known [2] for preparing a sintered porous body made of ceramic and/or metallic materials, which includes the mixing of an aqueous suspension containing powders of ceramic or metallic materials and of a binding resin (binder) which is a water-soluble polymer which can gel, and a blowing agent which activates the porosity of the gel, which becomes expanded; as the temperature increases, a porous metallic-ceramic material is formed by drying and sintering and its polymeric part is eliminated by pyrolization.

Another known method for preparing porous ceramic materials includes mixing ceramic powders with solid or hollow plastic pellets [4], [5] in a liquid in order to obtain a suspension, followed by drying and treatment in a high-temperature oven in an oxygen-free environment so that the plastic pellets that first act as adhesive for the ceramic powders are eliminated by pyrolysis, forming porosities.

It is also known that silica gels dissociate in the presence of water and alkaline metal hydroxides and can be destabilized further by other components, such as for example organic components known as electrolytes, which convert silica sol into gel by means of a phase transition depending on the degree of alkalinity of the aqueous suspension of silica, generating gel systems of a different kind [3]. A particular type of gel forms when the destabilization process of a colloidal solution of silica and alkaline compounds is activated by neutral reagents or acids, for example organic or mineral acids, esters and salts Known processes for obtaining porous ceramic materials with high heat resistance generally entail a technology which is highly advanced from an engineering standpoint and very complicated and laborious to obtain refractory articles having a particular shape.

Moreover, in known processes, particularly advanced and sophisticated technologies which are not convenient in terms of production costs are applied to obtain large amounts of material in the industrial field.

SUMMARY OF THE INVENTION

The aim of the present invention is to provide a method for preparing a porous ceramic material which is simple, inexpensive, and easy to use industrially and has a performance which can be compared with known more sophisticated and technologically advanced porous ceramic materials.

An object of the present invention is also to provide a process for preparing a porous ceramic material which takes into account environmental and workplace hygiene aspects, porous ceramic materials which can be used instead of traditional materials such as mineral fibers, which are potentially pathogenic for the respiratory tract, for example due to the micrometer-size dust spread in the atmosphere during processing, and due to their skin irritation power, and also have difficulties in the disposal of the associated waste.

Another object of the present invention is to provide a method for preparing a porous ceramic material which allows to fill even cavities and interspaces having a very complex shape without forming, over time, even in conditions of vibration or displacement caused by thermal expansions, dust or voids and discontinuities of the material between the interspaces.

Another object of the present invention is to provide a method for preparing porous ceramic material which has no negative effects on human health.

Another object of the present invention is to provide a method for producing a porous ceramic material which allows complete recyclability of the material and the use of production residues for other applications, for example as absorbent powders for industrial oil spills and as additive for producing flameproof glass.

Another object of the present invention is to provide a method for preparing a porous ceramic material in a homogeneous form with good resistance to mechanical stresses.

Another object of the present invention is to provide a method for preparing a porous ceramic material which can be used as absorbent powder in case of industrial oil spills, as additive for the production of flameproof glass, and as a material having piezoelectric properties.

Still another object of the present invention is to provide a method for preparing a porous ceramic material for use in multilayer materials, in the form of profiles, sheets, bars, and can be worked with manual tools and machine tools This aim and these and other objects which will become better apparent from the following detailed description of the invention are achieved by the method for preparing a porous ceramic material, particularly for thermal insulation, comprising the steps of:
  providing a first composition in the form of a stable aqueous colloidal solution of silica and oxides of alkaline metals;
  providing a second stable composition in the form of a suspension in an organic liquid of inorganic and/or organic particles, said second composition containing compounds which, when the second composition is mixed with said first composition, can destabilize said first composition, forming gel, and can form an organic polymeric mesh together with a blowing agent;
  mixing said first composition and said second composition to form a mixture;
  forming from said mixture a porous structure in gel form, where an organic structure supports inorganic structures being formed;
  solidifying said porous structure in gel form, obtaining a porous ceramic material in which an organic polymeric net surrounds inorganic parts.

The method according to the present invention can further comprise the step of:
  introducing the formed gel, before solidification, in a mold, an interspace or a cavity by injection or extrusion, followed by solidifying the gel in situ in said mold, interspace or cavity, obtaining a porous ceramic material in which an organic polymeric net surrounds inorganic ceramic parts.

Conveniently, the first composition can also comprise ceramic materials, for example ceramic materials selected from the group consisting of aluminum oxide, silicon oxide, titanium oxide, zirconium oxide, silicon carbide, titanium carbide, silicon nitride, ferric oxide, magnesium hydroxide, oxides and carbonates of alkaline and alkaline-earth metals. The oxides of alkaline metals can be selected from the group consisting of sodium oxide, potassium oxide, lithium oxide, and are preferably sodium oxide.

Moreover, the first aqueous composition can comprise a polymerization catalyst.

Examples of compounds capable of destabilizing said first colloidal composition with gel formation are organic and inorganic acids, silica, esters, ethers, anhydrides and salts of organic and inorganic acids, organic electrolytes, borates, carbonates, carbides, nitrites, nitrides, ammonium salts, oxides, peroxides, silicates, phosphates, phosphites, sulfates, chlorides, selenides, titanates.

Examples of compounds capable of forming, when said second composition is mixed with said first composition, an organic polymeric mesh and compounds adapted of forming a blowing agent are one or more compounds of the group constituted by organic polymerizable monomers and/or organic compounds adapted to provide, by reaction with water, organic polymerizable monomers, organic acid anhydrides, organic acid esters, organic acid alkoxy esters, salts of organic acids, ethers and organic acids and metallic acetylides.

The second composition preferably comprises calcium carbide. Advantageously, the second composition can comprise calcium carbide, acetic anhydride and/or ethyl acetoacetate and/or ethyl acetate.

The first composition preferably contains sodium silicate. Advantageously, the first composition contains sodium silicate and the second composition contains calcium carbide and acetic anhydride.

The inorganic particles of the second composition can be selected among one or more of the compounds selected from the group consisting of calcium carbide, potassium tetraborate, calcium carbonate, sodium perborate, boric acid, calcium oxide, potassium sulfate and sodium sulfate.

Moreover, the second composition can comprise an emulsifier, for example selected among the group consisting of potassium acetate, calcium carbonate, titanium dioxide, potassium hydroxide, potassium tetracarbonate, sodium oxide.

The mixing step of the method according to the present invention can be carried out for example at a temperature ranging from 10 to 120° C., at a subatmospheric, atmospheric or superatmospheric pressure, and at a weight ratio between said first composition and said second composition ranging from 2 to 50.

The inorganic particles can have for example an average size of less than 100 micrometers, particularly ranging from 5 to 25 micrometers, but can also have a nanometer size (for example, from 5 to 30 nm, as in the case of nanometer dust).

BRIEF DESCRIPTION OF THE DRAWINGS

The characteristics of the porous ceramic material that can be obtained by means of the method according to the present invention are also shown by the accompanying figures, which relate to some examples of application of the process according to the present invention.

FIG. 6 is a view of a detail of FIG. 4, highlighting portion a.

DESCRIPTION OF THE PREFERRED EMBODIMENTS

Figure 1:
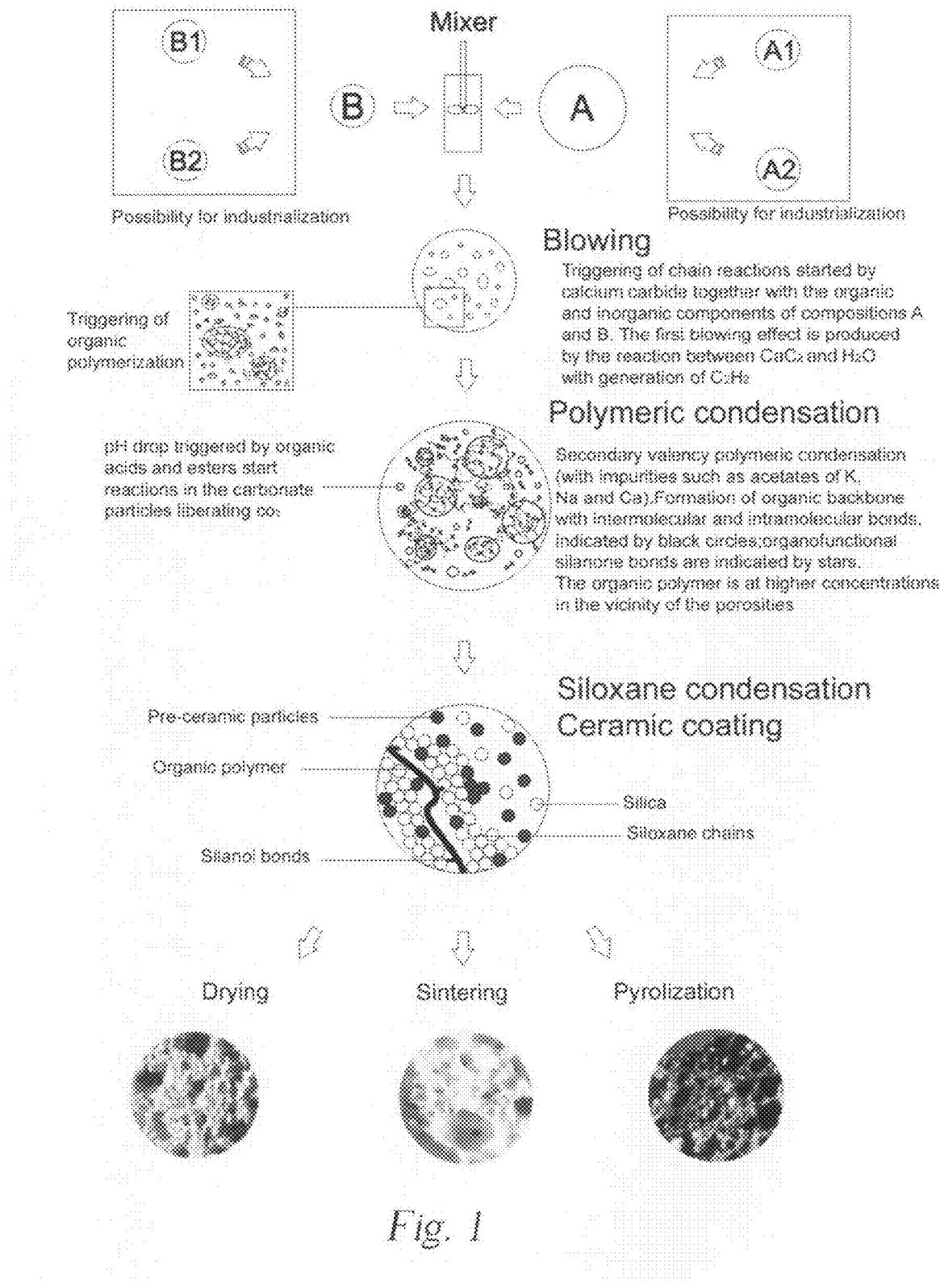
FIG. 1 is a schematic representation of an embodiment of the method according to the present invention.
Figure 2:
FIG. 2 is a view of a detail of the organic polymeric portion that coats the ceramic surface.
Figure 3:
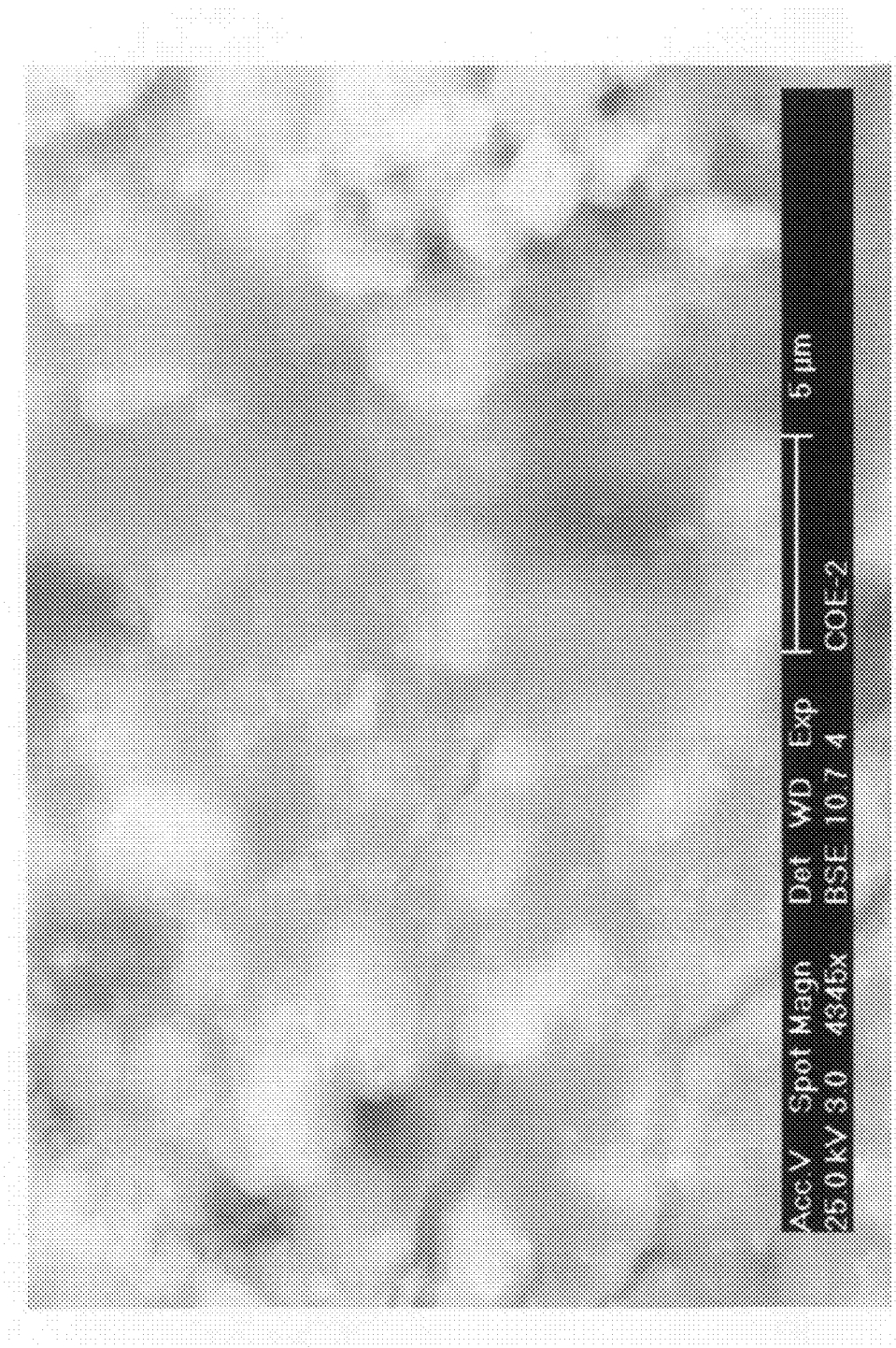
FIG. 3 is a view of the same detail as FIG. 2, with a different sensor suitable to highlight, in a sort of semitransparent image, the ceramic portions that lie below the organic polymer, which are lighter.
Figure 4:
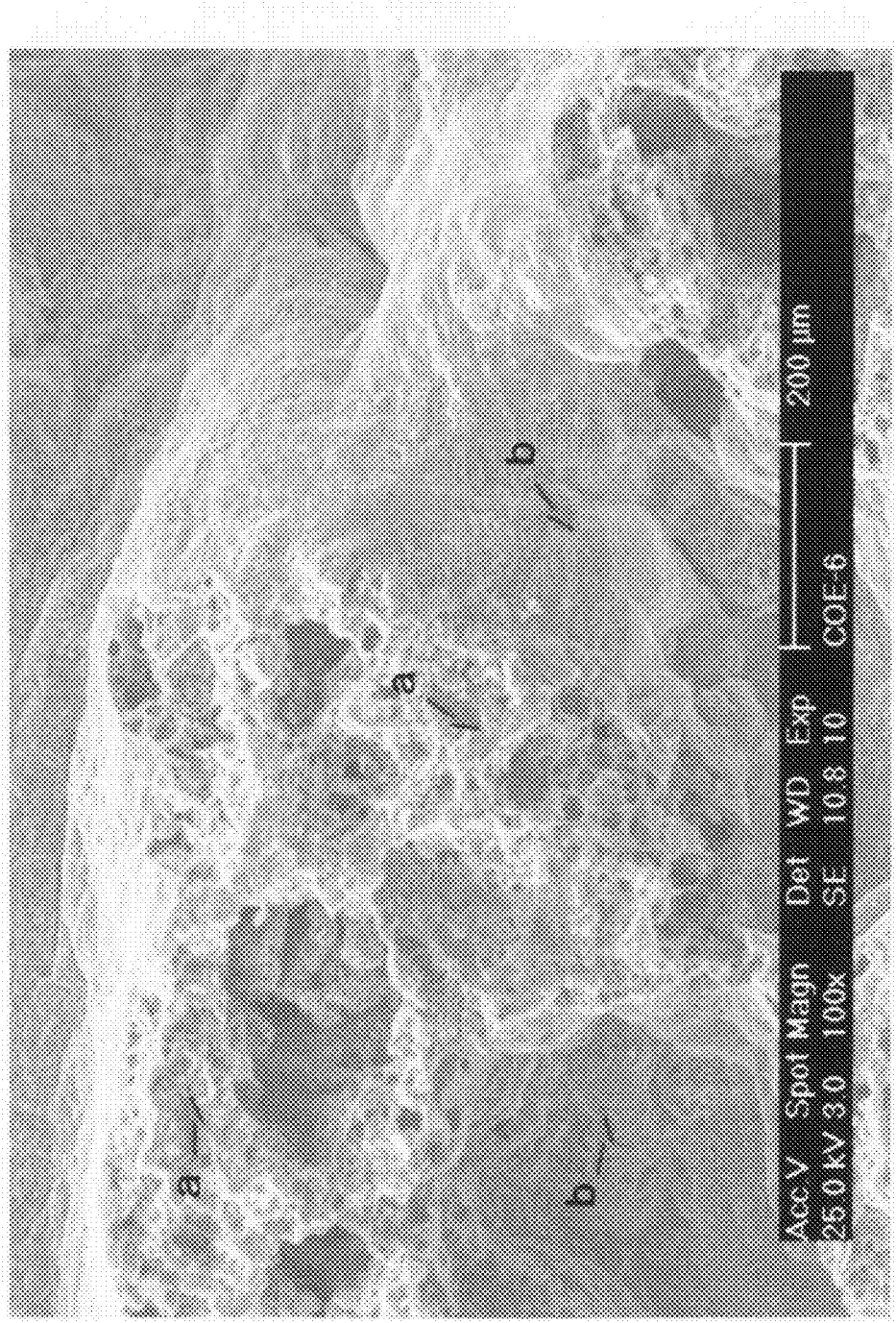
FIG. 4 is a view of hollow regions produced by the blowing agent (bubbles), coated internally by an organic polymeric sheath (b) and shows in cross-section a ceramic microporous portion (a) composed of silica and other ceramic particles without organic polymer.
Figure 5:
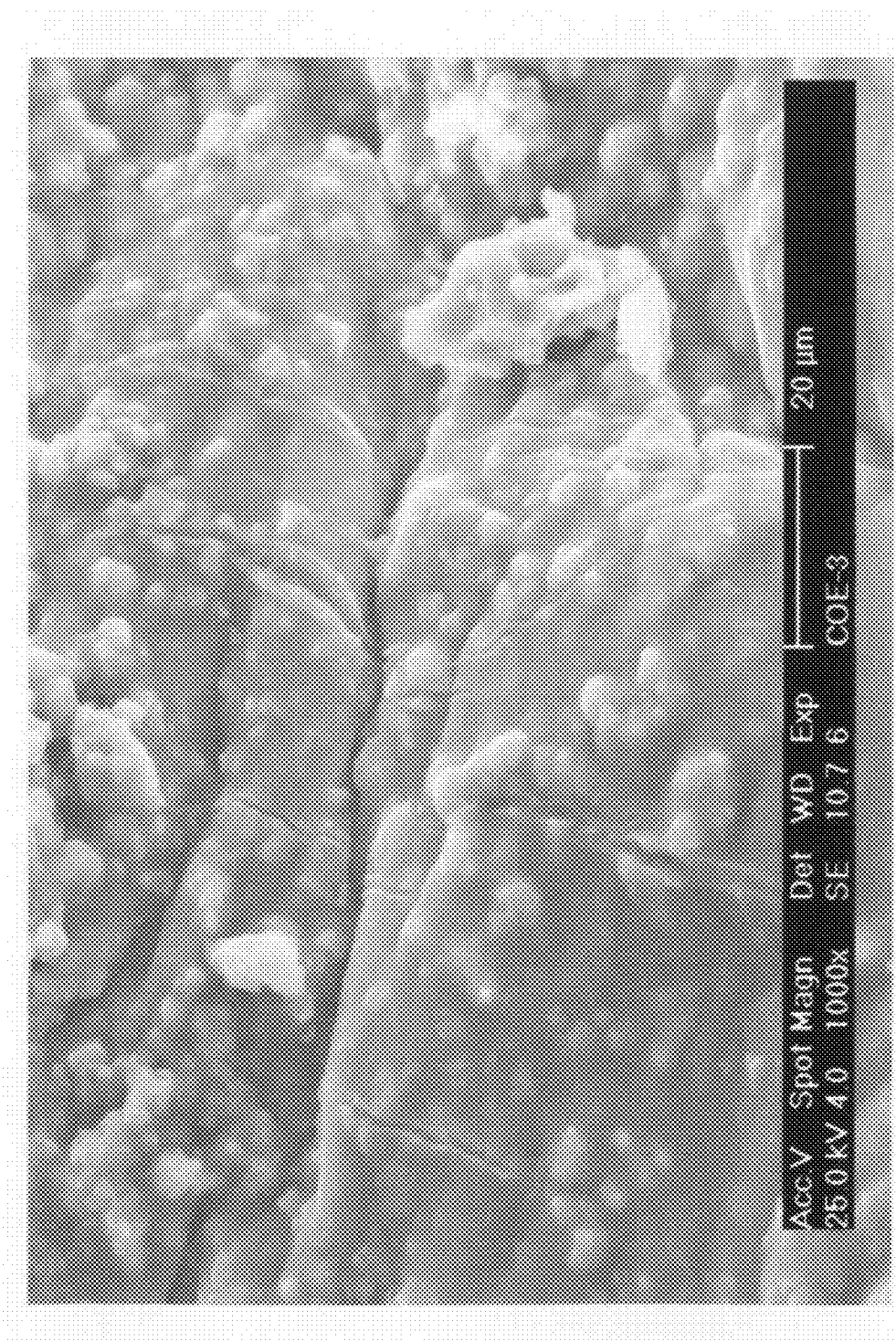
FIG. 5 is a view of a detail of FIG. 4, highlighting portion b.
Figure 6:
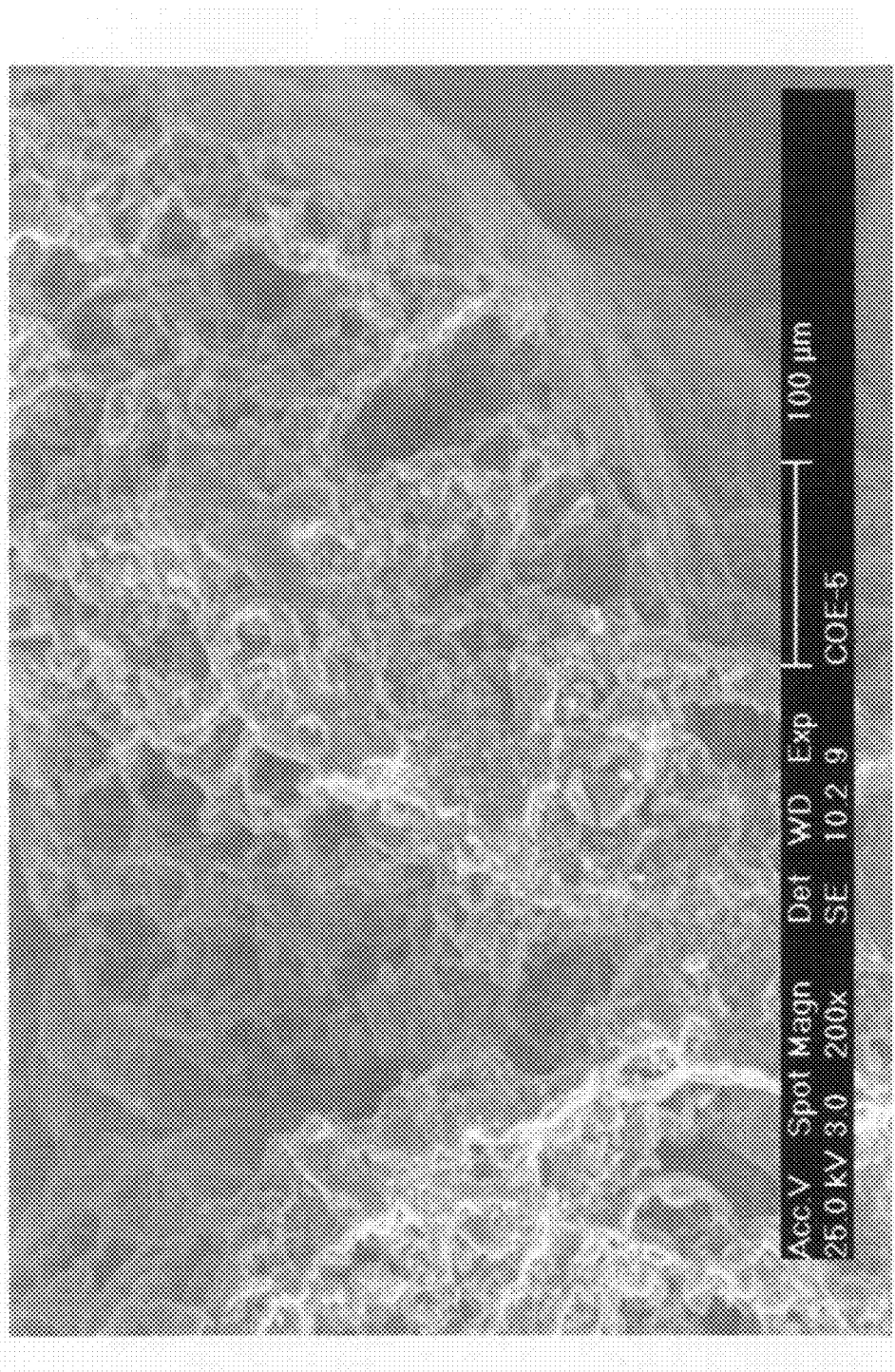
Figure 7:
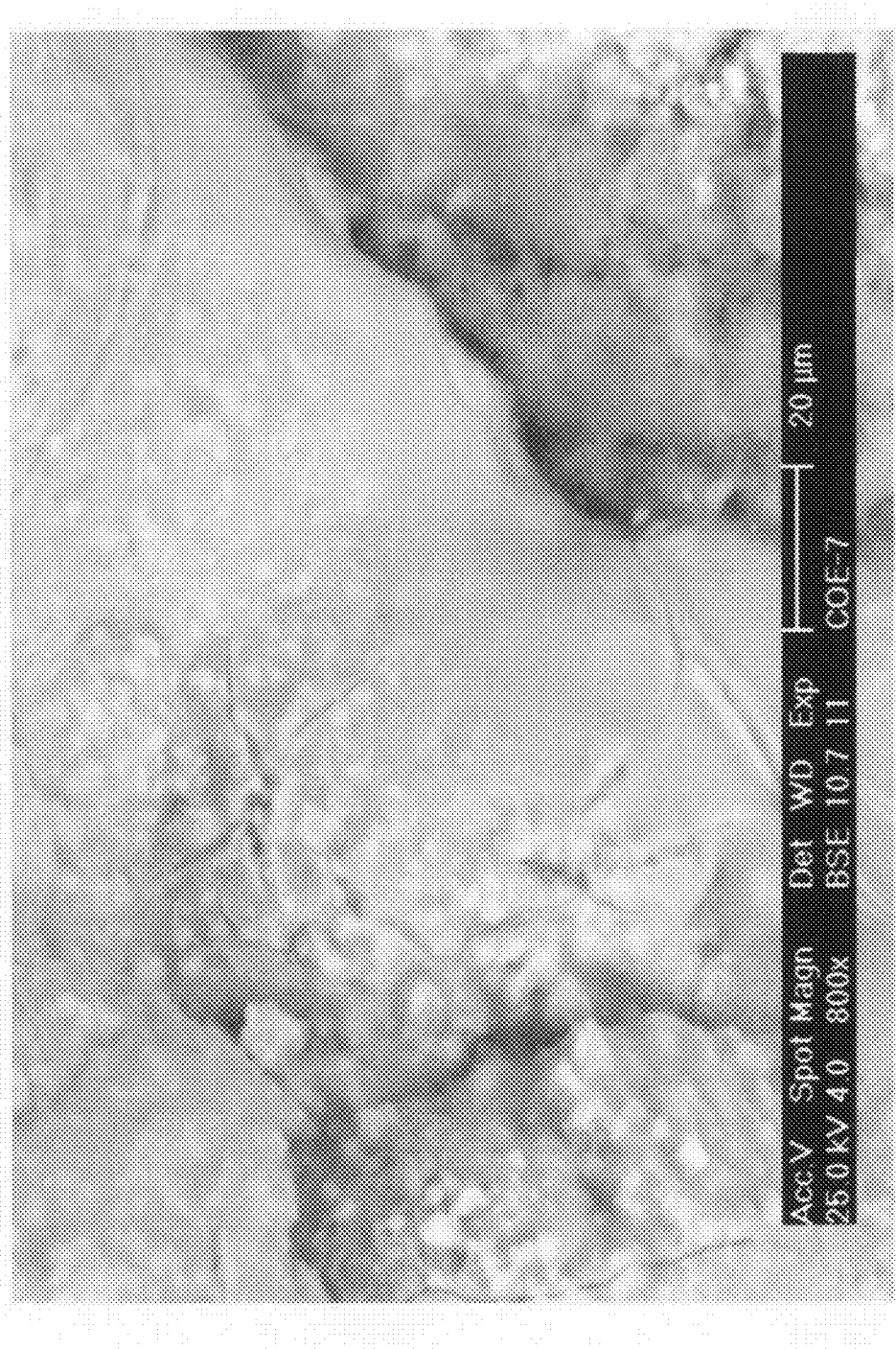
FIGS. 7 and 8 are views of details of microsilica-ceramic structures.
Figure 8:
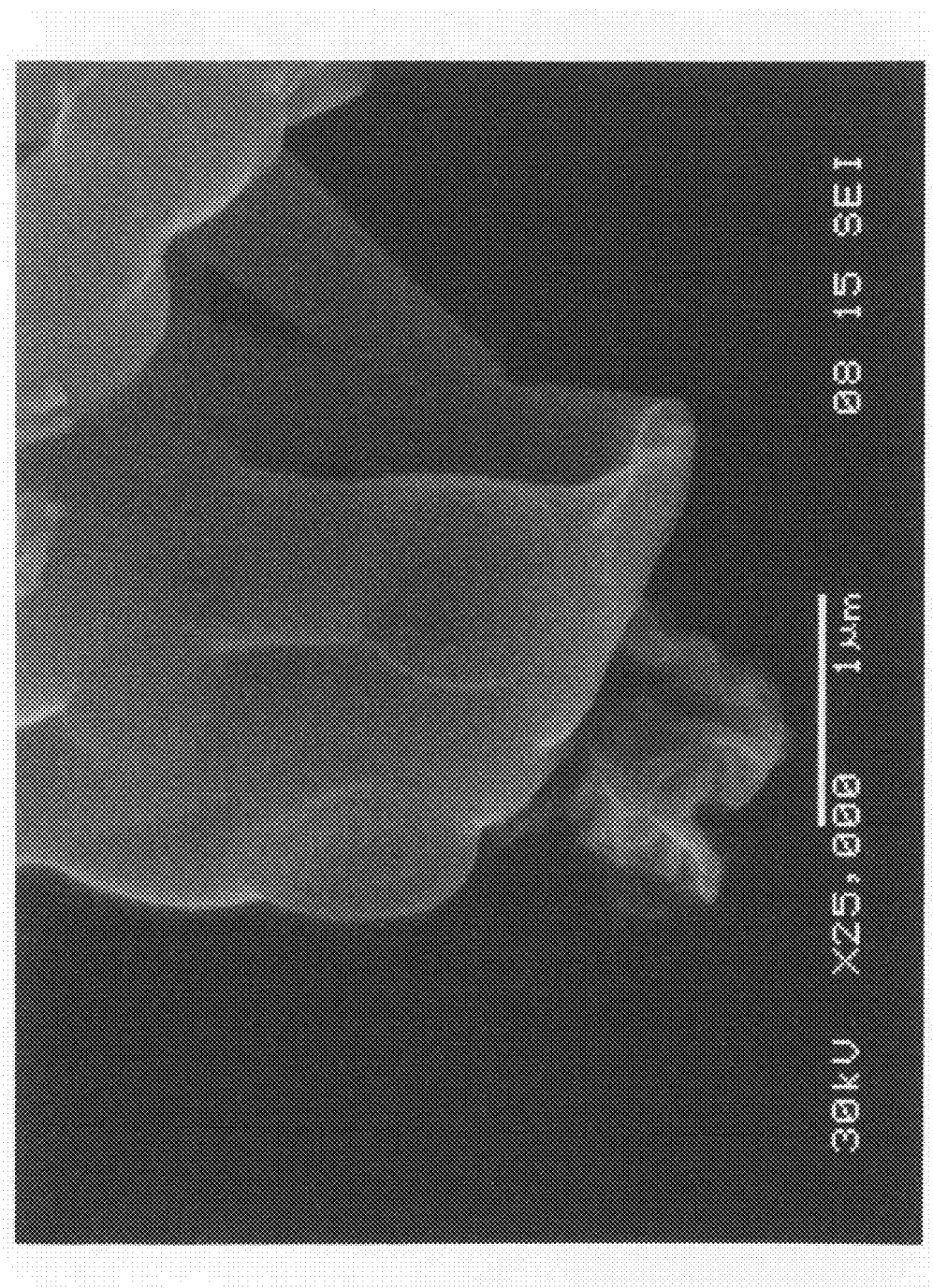
Figure 9:
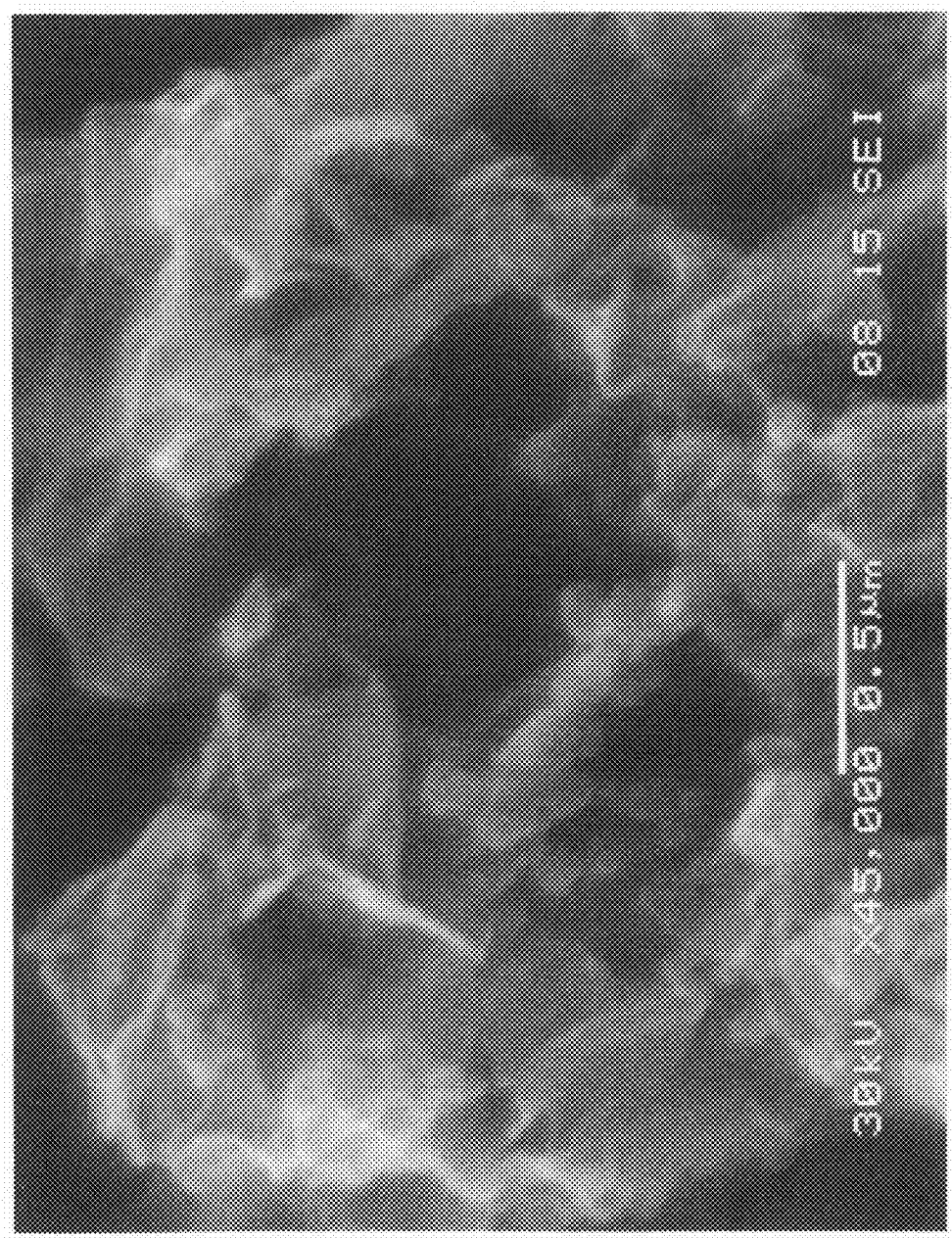
FIGS. 9 and 10 are views of details of the interactions between the silicaceramic and organic polymer.
Figure 10:
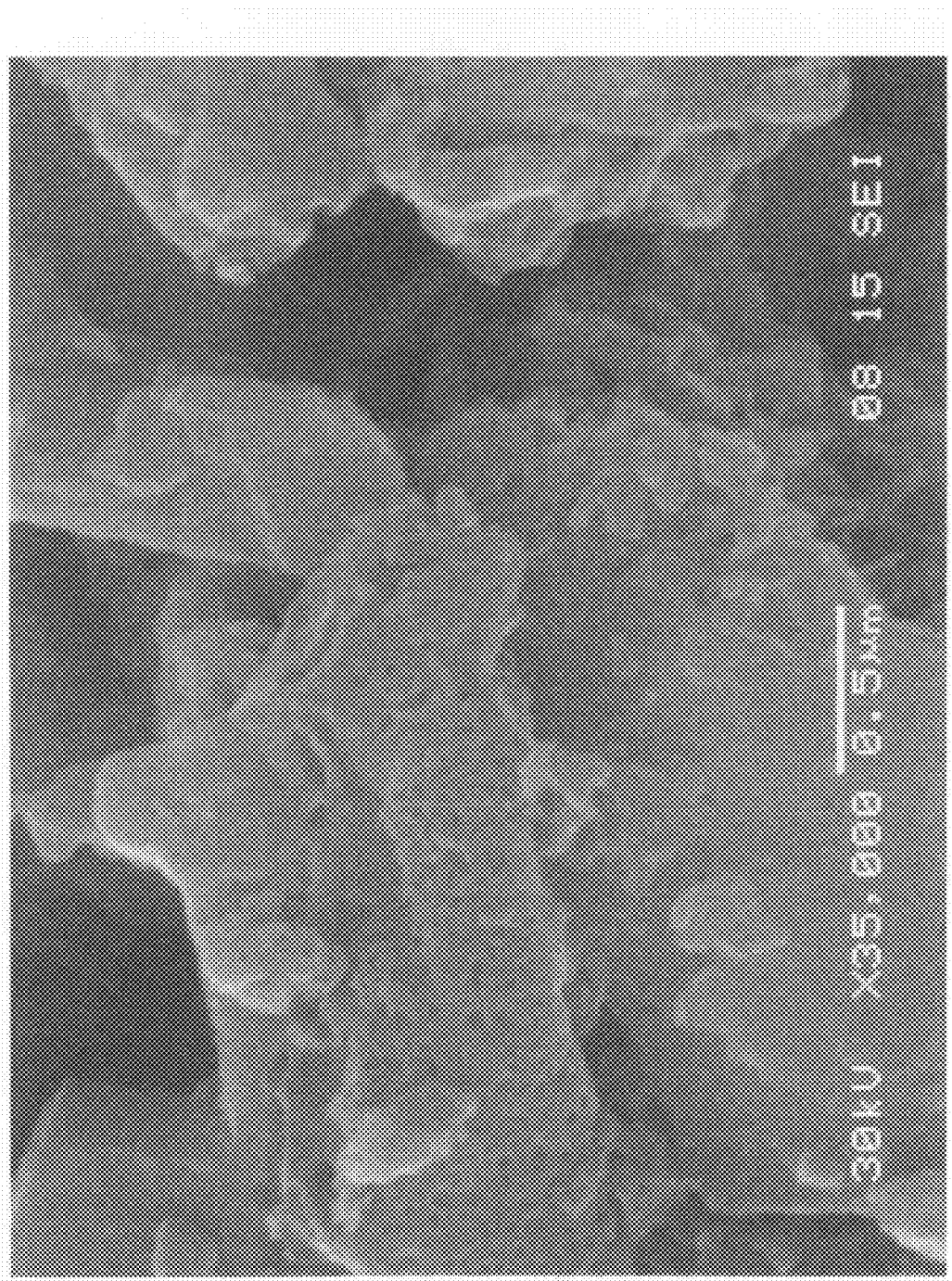

The following are some parameters which can affect the morphologic characteristics of the material:

percentage of silica, modulus of the initial polysilicate solution $SiO_2/M_2O$ with respect not only to $Na_2O$ but also to the other alkaline metals depending on their stability in the silanol system of the solution in $H_2O$. For example in industrial solutions of colloidal sodium silicate, this ratio is expressed as a weight ratio R; this ratio is available in a range of solutions which are more or less rich in silica, usually from $Na_2O.1.6SiO_2$ to $Na_2O.3.8SiO_2$ and in various intermediate ratios. Another important parameter of polysilicate sols is expressed in °Bè (degrees Baumé), a value which is expressed to indicate the concentration of the solutions. Similar parameters can be found in the other solutions of colloidal silica with other alkaline metals, such as for example in potassium silicate.

percentage and nature of the ceramic particles of mixture A which are stable and must be selected depending on the composition of the final ceramic product. In general, $Al_2O_3$, $SiO_2$, $TiO_2$, $ZrO_2$, SiC, TiC, SiN, $CaCO_3$, $MgCO_3$, $Mg(OH)_2$, $Fe_2O_3$ and other oxides and carbonates of metals, in such percentages as to not compromise the stability of the polysilicate solution, paying particular attention to variations in pH, which must not be lower than pH 10.

percentage and manner of the addition of the organic components in mixture B and their ratio with the other inorganic components (with particular reference to components such as calcium carbide) and of course their interaction, if any, and degree of polymerization of the organic components (which can be obtained by means of microscopic optical-chemical measurements aimed at identifying their three-dimensional structure and stability over time).

weight ratio of the relation A/B in terms of both weight and volume, by means of their density and partial individual percentages. This ratio was verified with experimental tests as being variable, with B=2% to 35% by weight of A.

Flocculating properties (of aggregation and clustering) linked to the miscibility of suspensions A and B and of the method in its several steps.

Total rate of A+B chemical reactions in relation to their dynamic mixing. These variables are affected by the characteristics of the system used to perform their mixing.

Viscosity and density of the suspensions A and B.

Time and temperatures of the process.

It is therefore evident that the variables of the materials and processes are certainly related to the morphologic properties of the ceramic product, in its final location after injection, the granular structure and the cells (number and size), and any diversification thereof in their structural physical properties.

Substantially, the method according to the present invention comprises the mixing of two distinct stable compositions, a composition in the form of a solution or suspension of colloidal silica based on water (A) and a composition in the form of a suspension of inorganic particles in an organic liquid o in a mixture of organic liquids of (B), which can be prepared and deposited separately for a long time without undergoing modifications.

In one embodiment, a new hybrid ceramic-organic material is obtained by means of the method according to the present invention by mixing:

A stable solution A of colloidal silica comprising, in dispersion, other ceramic particles depending on the ceramic-organicized type to be developed.

A stable suspension B of organic liquids comprising, in dispersion, other organic and inorganic particles adapted to destabilize and trigger the polymeric condensation of the suspension A in A+B.

The two reacting suspensions, "A" and "B", used in the method according to the present invention are prepared separately by mixing uniformly first the powders in suspension in the respective solvents. In case A, they are for example: liquid sodium silicate in the state of colloidal aqueous aggregation of $SiO_2$ with the addition of powders of metals, oxides and carbonates of metals and alkaline metals. In case B, they are for example: acetic anhydride and ethyl acetoacetate, both liquid as destabilizing agents of $SiO_2$ of the electrolytic type, with the addition of oxides, carbonates, borates of metals and alkaline metals, once mixed with the suspension A they become responsible for the conversion from the colloidal state of the silica to a gel state depending on the pH of the mixture composed of A+B. In this phase transition, siloxane condensation occurs by using as base the organic polymeric formations, which also originate from reactions which are the result of A+B. In this hybrid organic-inorganic polymeric condensation, a network formed by the ramified chains having a three-dimensional structure is consolidated, said chains inserting in the mesh of the net polymerized chemical compounds both as silica chains and as colloidal silica particles, even and especially in the presence of alkaline substances, which occupy the large spaces of the colloidal tetrahedral structure of silica, forming, as in glass, alkaline-metal polysilicates, hydroxides and carbonates.

It should be noted that the ceramic particles are not indispensable for carrying out the reaction but affect the performance of the resulting material.

One might therefore summarize that for example the following steps occur during the method of the present invention:

A dispersion 1A of the ceramic particles in a colloidal solution of silica A

A dispersion 1B of the destabilizing particles in a mixture of organic liquids with a polymeric matrix B A destabilization 2 in A+B by means of organic and inorganic compounds present in B or generated by mixing A and B, which may or may not polymerize but certainly contribute to the conversion from sol to gel.

The polymerization 3 of the organic elements, simultaneous with the step of siloxane condensation from sol to gel, thus allowing the formation of an organic skeleton during two processes: a process for formation expanding gases; a process of agglomeration of the polysilicate ceramic particles, which by amalgamating with the organic skeleton by way of organofunctional silanol bonds or simply interactions of ion affinity, form the porous organicized ceramic structure of the present invention.

The drying 4 allows to accelerate the process of elimination of the excess solvent and can be carried out at temperatures ranging from 40 to 160° C. without altering the morphologic properties of the material. This operation can be carried out in ovens or directly at the installation location, by using a controlled and gradual temperature rise.

The sintering 5 is optional and allows to consolidate a three-dimensional structural construction by amalgamating the silicate alkaline metal compounds like a true ceramic, thus improving the physical features of the material. It should be noted that by raising the material to sintering temperature, pyrolization of the polymeric organic structure occurs In a particular embodiment, composition A is a stable colloidal solution of sodium silicate and composition B is a stable suspension containing calcium carbide, acetic anhydride and ethyl ester.

In other preferred embodiments, composition A contains also one or more compounds selected among zirconium dioxide, calcium carbonate, alumina, magnesium carbonate, titanium oxide and aluminum.

In one embodiment, composition A comprises the colloidal solution of sodium silicate and composition B comprises powder of calcium carbide, acetic anhydride and ethyl ester.

In another embodiment, composition A comprises a colloidal solution of sodium silicate, powder of alumina and powder of ferric oxide and composition B comprises powder of calcium oxide, powder of calcium carbide, powder of silica, powder of potassium sulfate, acetic anhydride and ethyl acetate.

In another embodiment, composition A comprises a colloidal solution of sodium silicate, powder of titanium dioxide, powder of alumina, powder of ferric oxide and powder of aluminum and composition B comprises potassium tetraborate, potassium acetate, calcium carbide, silica, calcium carbonate, acetic anhydride, ethyl ester and ethyl acetate.

Without intending to be bound by a specific hypothesis regarding the mechanism, one can assume that the process according to the invention, in particular embodiments, occurs after the mixing of the components A and B according to the following main substeps:

SUBSTEP 1 the calcium carbide of mixture "B" reacts with the $H_2O$ of mixture "A";

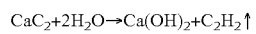

$CaC_2 + 2H_2O \rightarrow Ca(OH)_2 + C_2H_2 \uparrow$ the acetic anhydride of mixture "B" reacts with $H_2O$ of mixture "A";

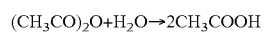

$(CH_3CO)_2O + H_2O \rightarrow 2CH_3COOH$ the ethyl ester of mixture "B" reacts with the sodium hydride (a base alcohol) of mixture "A";

$$CH_3COCH_2COOCH_2CH_3 + 2NaOH \rightarrow 2CH_3COONa + C_2H_5OH$$

The compounds that have formed in the first subphase react by forming organic polymers which constitute the organic skeleton. These reactions develop simultaneously, and at a higher concentration, in the formation of the porous cells due to the dual effect of the blowing agent. This agent behaves as a blowing agent, forming open and closed cells, and has the fundamental role of initiator of the organic polymeric condensation reactions.

The resulting organic polymeric structure behaves like a sheath, i.e., it acts like a skeleton, wraps around the inorganic structures of the polysilicates, providing the support required for consolidation of the siloxane chains formed by the phase transition from sol to gel.

SUBSTEP 2

Acetic acid combines with acetylene and reacts, producing polyvinyl acetate;

$$CH_3COOH + C_2H_2 \rightarrow (CH_2CHOCOCH_3)_n$$

Sodium acetate combines with acetylene and water, and reacts producing polyvinyl acetate and sodium hydroxide;

$$CH_3COONa + C_2H_2 + H_2O \rightarrow (CH_2CHOCOCH_3)_n + NaOH$$

Potassium acetate combines with acetylene and water, and reacts producing polyvinyl acetate and potassium hydroxide;

$$CH_3COOK + C_2H_2 + H_2O \rightarrow (CH_2CHOCOCH_3)_n + KOH$$

Ethyl alcohol combines with calcium carbide and water, and reacts producing calcium hydroxide and ethylene:

$$2C_2H_5OH + 2CaC_2 + H_2O \rightarrow 2Ca(OH)_2 + 2C_2H_4 \uparrow$$

Acetic acid combines with calcium carbonate and reacts, producing calcium acetate, water and carbon dioxide;

$$2CH_3COOH + CaCO_3 \rightarrow Ca(CH_3COO)_2 + H_2O + CO_2 \uparrow$$

SUBSTEP 3

The organic polymeric chains which have formed in subphase 2 undergo further reactions in the presence of the alcohol base of sodium.

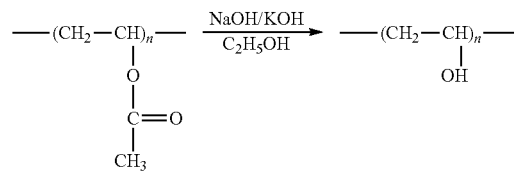

Thus, the final organic skeleton is obtained, which can be defined chemically as a polymeric condensation of secondary valency with intermolecular and intramolecular bonds of the ramified type of a copolymer of polyvinyl alcohol and polyvinyl acetate having a certain molecular weight containing impurities such as acetates of K, Ca, Na, comprising organofunctional silanol and polysilanol bonds.

Simultaneously with the polymerization reactions, the pH values drop and the alkaline polysilicates condense, including the ions and other inorganic molecules that are present, which are attracted by the negative charge of the electrolytic organic components of the organic skeleton after the mixing of A+B, where formations occur of the organicized ceramizing amorphous silicates and carbonates in the glassy or crystalline state with the porosities produced by the blowing gas activities, such as predominantly $C_2H_2$ and, occasionally, $CO_2$ and $C_2H_4$ which are present as a consequence of the composition of the reagents.

EXAMPLES

Merely by way of nonlimiting example for the scope of the present invention, the following examples of compositions A and B used in the method according to the present invention are presented.

Example 1

TABLE 1.1

| Part "A" Chemical composition | State of aggregation | Weight (g) | Remarks |
|---|---|---|---|
| $Na_2O$—3.4 $SiO_2$—$H_2O$ Sodium silicate | Colloidal solution | 100 | The solution is stable only on its own |

TABLE 1.2

| Part "B" Chemical composition | State of aggregation | Weight for 10 grams in total (g) | Remarks |
|---|---|---|---|
| $CaC_2$ Calcium carbide | Powder, average particle size 25 μm | 3.97 | Conceived as an active blowing agent for forming cells at low temperature whose gas from the reaction in $H_2O$ acts as initiator of organic polymerization. |
| $(CH_3CO)_2O$ Acetic anhydride | Organic solvent liquid | 1.70 | Polymeric electrolyte reagents which destabilize the silica of mixture A and polymerize |
| $CH_3COCH_2COO CH_2CH_3$ ethyl acetoacetate ethyl ester | Organic solvent liquid | 4.33 | |

Example 2

TABLE 2.1

| Inorganic reagent "A" Chemical composition | State of aggregation | Weight for 200 grams in total (g) |
|---|---|---|
| $Na_2O$—3.4 $SiO_2$—$H_2O$ Sodium silicate | Colloidal solution | 112 |
| $CaCO_3$ Calcium carbonate | Powder | 64 |
| $Al_2O_3$ Alumina | Powder | 21 |
| $Fe_2O_3$ Ferric oxide | Powder | 3 |

TABLE 2.2

| Reagent "B" Chemical composition | State of aggregation | Weight for 20 grams in total (g) |
|---|---|---|
| CaO Calcium oxide | Powder | 3.00 |
| CaC$_2$ Calcium carbide | Powder | 2.00 |
| SiO$_2$ Silica | Powder | 1.25 |
| K$_2$B$_4$O$_7$ Potassium tetraborate | Organic solvent liquid | 3.50 |
| (CH$_3$CO)$_2$O Acetic anhydride | Organic solvent liquid | 3.50 |
| CH$_3$COH$_2$COOCH$_2$CH$_3$ Ethyl acetoacetate ethyl ester | Organic solvent liquid | 8.90 |

Example 3

TABLE 3.1

| Part "A" Chemical composition | State of aggregation | % by weight for 100 grams in total (g) | Remarks* |
|---|---|---|---|
| Na$_2$O—3.4 SiO$_2$—H$_2$O Sodium silicate | Colloidal solution | 65.01 | The suspension is stable only on its own |
| CaCO$_3$ Calcium carbonate | Powder 2.8 μm (average) | 29.58 | The powders undergo no size change during the process |
| MgCO$_3$ Magnesium carbonate | Powder 2.8 μm (average) | 0.35 | |
| TiO$_2$ Titanium dioxide | Powder 2.3 μm (average) | 2.1 | |
| Al$_2$O$_3$ Al oxide - Alumina | Powder 3.2 μm (average) | 2.93 | |
| Fe$_2$O$_3$ Ferric oxide | Powder 2.2 μm (average) | 0.02 | |
| Al Aluminum | Powder 10 μm (average) | 0.01 | |

*The sodium silicate suspension is affected by dissolution variations but becomes stable in a certain time. The powders do not change or are conceived only for the final ceramic product.

TABLE 3.2

| Part "B" Chemical composition | State of aggregation | % by weight for 10 grams in total (g) | Remarks * |
|---|---|---|---|
| K$_2$B$_4$O$_7$ Potassium tetraborate | ** | 1.87 | Destabilization of Sol |
| CH$_3$COOK Potassium acetate | ** | 0.35 | Emulsifier "B" Electrolyte reagent |
| CaC$_2$ Calcium carbide | ** | 2.06 | Conceived as an active blowing agent for forming cells at low temperature and for generating organic polymerization. |
| SiO$_2$ Silica | ** | 0.05 | Destabilization of Sol |
| CaCO$_3$ Calcium carbonate | ** | 0.67 | Emulsifier "B" Ceramizing agent "A" |
| (CH$_3$CO)$_2$O Acetic anhydride | Organic solvent liquid | 2.85 | Polymeric electrolyte reagents which destabilize the |
| CH$_3$CH$_2$COOCH$_2$CH$_3$ Ethyl acetoacetate | Organic solvent liquid | 2.15 | silica of mixture A and polymerize |

* The suspension undergoes physical modifications, but becomes stable after a certain time
** The inorganic powders are homogenized mechanically or with ultrasound until a particle size distribution ranging from 5 to 25 μm is achieved

Example 4

TABLE 4.1

| Inorganic reagent "A" Chemical composition | State of aggregation | Weight for 100 grams in total (g) |
|---|---|---|
| Na$_2$O—3.8 SiO$_2$—H$_2$O Sodium silicate | Colloidal solution | 63.8 |
| TiO$_2$ Titanium dioxide | Powder | 15 |
| MgO$_2$ Magnesium peroxide | Powder | 0.2 |
| Al(OH)$_3$ Aluminum hydroxide | Powder | 21 |

TABLE 4.2

| Reagent "B" Chemical composition | State of aggregation | Weight for 16 grams in total (g) |
|---|---|---|
| H$_2$BO$_3$ Boric acid | Powder | 4.3 |
| CaC$_2$ Calcium carbide | Powder | 2.00 |
| TiO$_2$ Titanium dioxide | Powder | 1.2 |
| CH$_3$COOK Potassium acetate | Powder | 0.3 |
| (CH$_3$CO)$_2$O Acetic anhydride | Organic solvent liquid | 8.2 |

Example 5

TABLE 5.1

| Inorganic reagent "A" Chemical composition | State of aggregation | Weight for 110 grams in total (g) |
|---|---|---|
| Na$_2$O—3.4 SiO$_2$—H$_2$O Sodium silicate | Colloidal solution | 72 |
| TiO$_2$ Titanium dioxide | Powder | 5 |
| K$_2$B$_4$O$_7$ Potassium tetraborate | Powder | 1 |
| Al(OH)$_3$ Aluminum hydroxide | Powder | 22 |
| ZrO$_2$ Zirconium dioxide | Powder | 10 |

TABLE 5.2

| Reagent "B" Chemical composition | State of aggregation | Weight for 22.7 grams in total (g) |
|---|---|---|
| B$_2$O$_3$ Boric anhydride | Powder | 3.4 |

TABLE 5.2-continued

| Reagent "B" Chemical composition | State of aggregation | Weight for 22.7 grams in total (g) |
|---|---|---|
| $CaC_2$ Calcium carbide | Powder | 3.0 |
| $TiO_2$ Titanium dioxide | Powder | 1.2 |
| $CH_3COH_2COOCH_2CH_3$ Ethyl acetoacetate ethyl ester | Organic solvent liquid | 1.8 |
| $CH_3COOC_2H_5$ Ethyl acetate | Organic solvent liquid | 8.2 |
| $(CH_3CO)_2O$ Acetic anhydride | Organic solvent liquid | 5.1 |

Example 6

TABLE 6.1

| Inorganic reagent "A" Chemical composition | State of aggregation | Weight (g) |
|---|---|---|
| $Na_2O$—3.4 $SiO_2$—$H_2O$ Sodium silicate | Colloidal solution | 100 |
| $ZrO_2$ Zirconium dioxide | Powder | 18 |

TABLE 6.2

| Reagent "B" Chemical composition | State of aggregation | Weight for 7.9 grams in total (g) |
|---|---|---|
| $CaC_2$ Calcium carbide | Powder average particle size 25 μm | 4.5 |
| $(CH_3CO)_2O$ Acetic anhydride | Organic solvent liquid | 3.2 |
| $(C_2H_5C)_2O$ Ethyl ester | Organic solvent liquid | 0.2 |

Example 7

TABLE 7.1

| Inorganic reagent "A" Chemical composition | State of aggregation | Weight (g) |
|---|---|---|
| $Na_2O$—3.4 $SiO_2$—$H_2O$ Sodium silicate | Colloidal solution | 280 |
| $Al_2O_3$ Alumina | Powder | 125 |

TABLE 7.2

| Reagent "B" Chemical composition | State of aggregation | Weight for 34.7 grams in total (g) |
|---|---|---|
| $B_2O_3$ Boric anhydride | Powder | 6 |
| $CaC_2$ Calcium carbide | Powder | 12.0 |
| KOH Potassium hydroxide | Powder | 0.7 |
| $CH_3COOC_2H_5$ Ethyl acetate | Organic solvent liquid | 14 |
| $(CH_3CO)_2O$ Acetic anhydride | Organic solvent liquid | 2 |

Moreover, for the sake of completeness, it should be added that it is conveniently possible to obtain different characteristics of the final material from a same initial formulation by subjecting reagent B to a thermal treatment and subsequent milling.

In this regard, taking for example as reference the formulation of reagent B according to Table 5.2 of Example 5 and, more specifically, the boric anhydride and the calcium carbide contained therein, it is possible to vary important characteristics of the final ceramic material, such as the morphology and size of the cells, by subjecting a mixture of these powders to accurate mixing and melting at temperatures preferably ranging from 500° C. to 1500° C. At the end of the thermal treatment, the resulting material is subjected to milling and screening in order to obtain the intended particle size, which can for example range from 5 to 25 μm. Optionally, it is possible to subject to the same thermal treatment also other powders together with calcium carbide, such as for example, silicon dioxide or also salts of organic acids or other organic or inorganic substances, adapting the melting temperatures appropriately. In this procedure it is not necessary to melt all the powders together, but it is sufficient to melt a single component to achieve the agglomeration of the other components with a higher melting point.

The method according to present invention allows to obtain a porous ceramic material which comprises portions of silica, optionally aggregates of silica and of ceramic portions, which constitute a separate inorganic portion which is contained in a separate organic net which acts as a skeleton and support for the inorganic portion, for the ceramic particles, even if they are agglomerated, with porosity, in which the organic net is provided by polymerization and might not only surround the inorganic portion but be bonded to it.

Although only some embodiments of the invention have been presented in the description, the person skilled in the art will understand immediately that it is in any case possible to obtain other equally advantageous and preferred embodiments.

The disclosures in Italian Patent Application No. VR2006A000035 from which this application claims priority are incorporated herein by reference.

What is claimed is:

1. A method for preparing a porous ceramic material, particularly for thermal insulation, comprising the steps of:
providing a first composition in the form of a stable aqueous colloidal solution of silica and oxides of alkali metals;
providing a second stable composition in the form of a suspension in an organic liquid of inorganic and/or organic particles, said second composition containing compounds for destabilizing said first compound;
mixing said first composition and said second composition to form a mixture wherein said first composition is destabilized to form a gel and an organic polymeric net and simultaneously a blowing agent;
forming from said mixture a porous structure in gel form, where an organic structure supports inorganic structures being formed;
solidifying said porous structure in gel form, obtaining a porous ceramic material in which an organic polymeric net surrounds inorganic portions.

2. The method according to claim 1, wherein said first composition also comprises ceramic materials.

3. The method, according to claim 2, wherein said ceramic materials are selected from the group consisting of aluminum oxide, silicon oxide, titanium oxide, zirconium oxide, silicon carbide, titanium carbide, silicon nitride, ferric oxide, magnesium hydroxide, oxides and carbonates of metals.

4. The method according to claim 1, wherein said oxides of alkali metals are selected from the group consisting of sodium oxide, potassium oxide, lithium oxide, and are preferably sodium oxide.

5. The method according to claim 1, wherein said first aqueous composition further comprises a polymerization catalyst.

6. The method according to claim 1, wherein said compounds capable of destabilizing said first colloidal composition with formation of a gel are selected from the group consisting of organic and inorganic acids, silica, esters, ethers, anhydrides and salts of organic and inorganic acids, organic electrolytes, borates, carbonates, carbides, nitrites, nitrides, ammonium salts, oxides, peroxides, silicates, phosphates, phosphites, sulfates, chlorides, selenides, titanates.

7. The method according to claim 1, wherein said compounds capable of forming, when said second composition is mixed with said first composition, an organic polymeric net and simultaneously a blowing agent are selected among one or more compounds of the group consisting of organic compounds adapted to provide by reaction with water, organic polymerizable monomers, organic acid anhydrides, organic acid esters, organic acid alkoxy esters, salts of organic acids, ethers and organic acids and metallic acetylides.

8. The method according to claim 1, wherein said second composition comprises calcium carbide.

9. The method according to claim 8, wherein said second composition comprises calcium carbide, acetic anhydride and/or ethyl acetoacetate and/or ethyl acetate.

10. The method according to claim 1, wherein the first composition contains sodium silicate and the second composition contains calcium carbide and acetic anhydride.

11. The method according to claim 1, wherein said inorganic particles are selected among one or more of the compounds selected from the group consisting of calcium carbide, potassium tetraborate, calcium carbonate, sodium perborate, boric acid, boric anhydride, calcium oxide, magnesium oxide, magnesium peroxide, silicon dioxide, aluminum hydroxide, potassium hydroxide.

12. The method according to claim 1, wherein said second composition comprises an emulsifier.

13. The method according to claim 12, wherein said emulsifier is selected from the group consisting of potassium acetate, calcium carbonate, titanium dioxide, potassium hydroxide, potassium tetracarbonate, sodium oxide.

14. The method according to claim 1, wherein said step of mixing said first composition and said second composition is carried out at a temperature from 10 to 120 °C., at a subatmospheric, atmospheric or superatmospheric pressure, and at a weight ratio between said first composition and said second composition ranging from 2 to 50.

15. The method according to claim 1, wherein said inorganic particles have an average size of less than 100 micrometers, particularly ranging from 5 to 25 micrometers.

16. The method according to claim 1, wherein said inorganic particles have nanometer-scale dimensions, preferably ranging from 5 to 30 nm.

17. The method according to claim 1, wherein at least one of the components of said second composition is subjected to a thermal treatment and subsequent milling.

18. The method according to claim 17, wherein said thermal treatment occurs at a temperature substantially ranging from 500° C. to 1500° C.

19. The method according to claim 1, further comprising the steps of:
 introducing said gel, before said solidification, in a mold, an interspace or a cavity by injection or extrusion of said gel; followed by
 solidifying the gel in situ in said mold, interspace or cavity, obtaining a porous ceramic material in which an organic polymeric net surrounds inorganic ceramic parts.

* * * * *